US011461750B2

(12) United States Patent
Galili (10) Patent No.: US 11,461,750 B2
(45) Date of Patent: Oct. 4, 2022

(54) PROVIDING PAYMENT OPTIONS WITHOUT REQUIRING ONLINE SHOP INTEGRATION

(71) Applicant: Avast Software s.r.o., Prague (CZ)

(72) Inventor: Nir Galili, Haarlem (NL)

(73) Assignee: Avast Software s.r.o., Prague (CZ)

( * ) Notice: Subject to any disclaimer, the term of this patent is extended or adjusted under 35 U.S.C. 154(b) by 48 days.

(21) Appl. No.: 15/926,877

(22) Filed: Mar. 20, 2018

(65) Prior Publication Data
US 2018/0285845 A1   Oct. 4, 2018

Related U.S. Application Data

(60) Provisional application No. 62/478,890, filed on Mar. 30, 2017.

(51) Int. Cl.
| | |
|---|---|
| *G06Q 30/00* | (2012.01) |
| *G06Q 20/12* | (2012.01) |
| *G06Q 30/06* | (2012.01) |
| *G06Q 20/34* | (2012.01) |
| *G06Q 20/40* | (2012.01) |

(52) U.S. Cl.
CPC ........... *G06Q 20/12* (2013.01); *G06Q 20/351* (2013.01); *G06Q 20/4016* (2013.01); *G06Q 30/0601* (2013.01); *G06Q 30/0609* (2013.01); *G06Q 30/0633* (2013.01)

(58) Field of Classification Search
CPC .. G06Q 20/12; G06Q 20/351; G06Q 20/4016; G06Q 30/0633
See application file for complete search history.

(56) References Cited

U.S. PATENT DOCUMENTS

| | | | | |
|---|---|---|---|---|
| 8,065,189 | B1 * | 11/2011 | Ballaro | G06Q 30/0603 |
| | | | | 705/26.1 |
| 11,107,110 | B2 * | 8/2021 | Rose | G06Q 20/326 |
| 2007/0271147 | A1 | 11/2007 | Crespo et al. | |
| 2010/0153265 | A1 | 6/2010 | Hershfield et al. | |
| 2014/0129435 | A1 | 5/2014 | Pardo et al. | |

FOREIGN PATENT DOCUMENTS

WO   2015145215 A1   10/2015

OTHER PUBLICATIONS

Taylor, Emmeline. "Mobile payment technologies in retail: a review of potential benefits and risks." International Journal of Retail & Distribution Management (2016).*

* cited by examiner

*Primary Examiner* — Kathleen Palavecino
(74) *Attorney, Agent, or Firm* — Avek IP, LLC; William B. Kircher (57) ABSTRACT

Initiation of a purchase at an online shop or other retailer can be detected. In addition to, or instead of a payment method integrated with the online shop, one or more alternative payment services that are not integrated with the online shop or retailer can be considered for selection. A non-integrated payment service can be selected based on terms offered by the non-integrated payment service. The selected goods or services can be paid for by the non-integrated payment service using a virtual credit card. The user can reimburse the non-integrated payment service under the terms offered by the non-integrated payment service.

22 Claims, 4 Drawing Sheets

PROVIDING PAYMENT OPTIONS WITHOUT REQUIRING ONLINE SHOP INTEGRATION

CROSS-REFERENCE TO RELATED APPLICATIONS

This Application claims priority to U.S. Provisional Patent Application Ser. No. 62/478,890, filed on Mar. 30, 2017, entitled "Providing Payment Options Without Requiring Online Shop Integration," the entire disclosure of which is incorporated herein by reference.

FIELD OF INVENTION

The present invention relates generally to computing systems, and more particularly, to providing payment options that do not require integration with an online shop.

BACKGROUND OF INVENTION

Online purchasing of goods and services continues to grow, and a large percentage of goods and services are now purchased through online sources. While online purchasing is convenient, a user is typically limited to payment options provided by the online shop via a payment service that is integrated with the online shop.

The proliferation of various means and methods for transferring currency has increased in recent years. Because retailers typically enter into agreements with only a finite number of payment services, a user may not always have the option to make a purchase using a payment service of their preference.

Accordingly, a need exists for a system and method providing users with an option to make purchases through a payment service that is not integrated with the retailer from which they are purchasing. A need also exists for a system and method adapted for selecting from one or more non-integrated payment services based on offers provided by various payment services.

SUMMARY OF INVENTION

The present invention generally relates to a system and method for providing a non-integrated payment service for an online shop or other retailer. One embodiment of the present invention is directed to a method wherein a purchase detector can be configured for detecting that a purchase has been initiated at the online shop. A risk assessor may be adapted for performing a risk evaluation of the user by determining and analyzing one or more risk factors associated with the user. A determination may be made if one or more of a plurality of non-integrated payment services is available. The results of the risk evaluation may be forwarded to the plurality of non-integrated payment services. At least one of the of non-integrated payment services may be configured for determining terms of an offer based, at least in part, on the results of the risk evaluation. Offers from one or more of the non-integrated payment services may be received and evaluated.

One of the non-integrated payment services made be selected from the plurality of non-integrated payment services. The non-integrated payment service may be selected by one or more processors or applications executed thereon. The selection of the non-integrated payment service can be based, at least in part, on the terms of the offer. Alternatively, the non-integrated payment service may be selected by the user. A user account may be created or logged into on behalf of the user. A detection of items in a first shopping cart associated with the online shop or other retailer may be undertaken. The items from the first shopping cart can be added to a second shopping cart that is associated with a backend server, for example. The addition of the items from the first shopping cart into the second shopping cart may be achieved by copying the items from the first shopping cart into the second shopping cart. In other embodiments, the addition of the items into the second shopping cart may be achieved by accessing a web page for each of the items in the first shopping cart and autonomously clicking to have the respective items added to the second shopping cart. In a further embodiment, the addition of the items into the second shopping cart may be achieved by accessing a uniform resource locator (URL) associated with the first shopping cart and copying the URL into the second shopping cart.

The items in the second shopping cart associated with the user account can then be purchased. The items in the second shopping cart may be paid for utilizing a virtual payment device associated with the selected non-integrated payment service. The virtual payment device can be a virtual credit card and may be supplied by the selected non-integrated payment service.

Another embodiment of the present invention relates to a non-transitory machine-readable medium having instructions stored thereon, the instructions comprising computer executable instructions that when executed are configured for providing a non-integrated payment service for an online shop or other retailer. In one embodiment, the computer executable instructions cause one or more processors to undertake one or more steps of the method generally described above.

A further aspect of the present invention relates to a system that includes one or more processors and a non-transitory machine-readable medium having computer executable instructions stored thereon adapted for providing a non-integrated payment service for making purchases as generally described above.

BRIEF DESCRIPTION OF THE DRAWINGS

For a better understanding of the disclosure, reference may be made to the accompanying drawings in which.

DETAILED DESCRIPTION

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the figures, the same reference number is used throughout to refer to an identical component that appears in multiple figures. Signals and connections may be referred to by the same reference number or label, and the actual meaning will be clear from its use in the context of the description. In general, the first digit(s) of the reference number for a given item or part of the invention should correspond to the figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Figure 1:
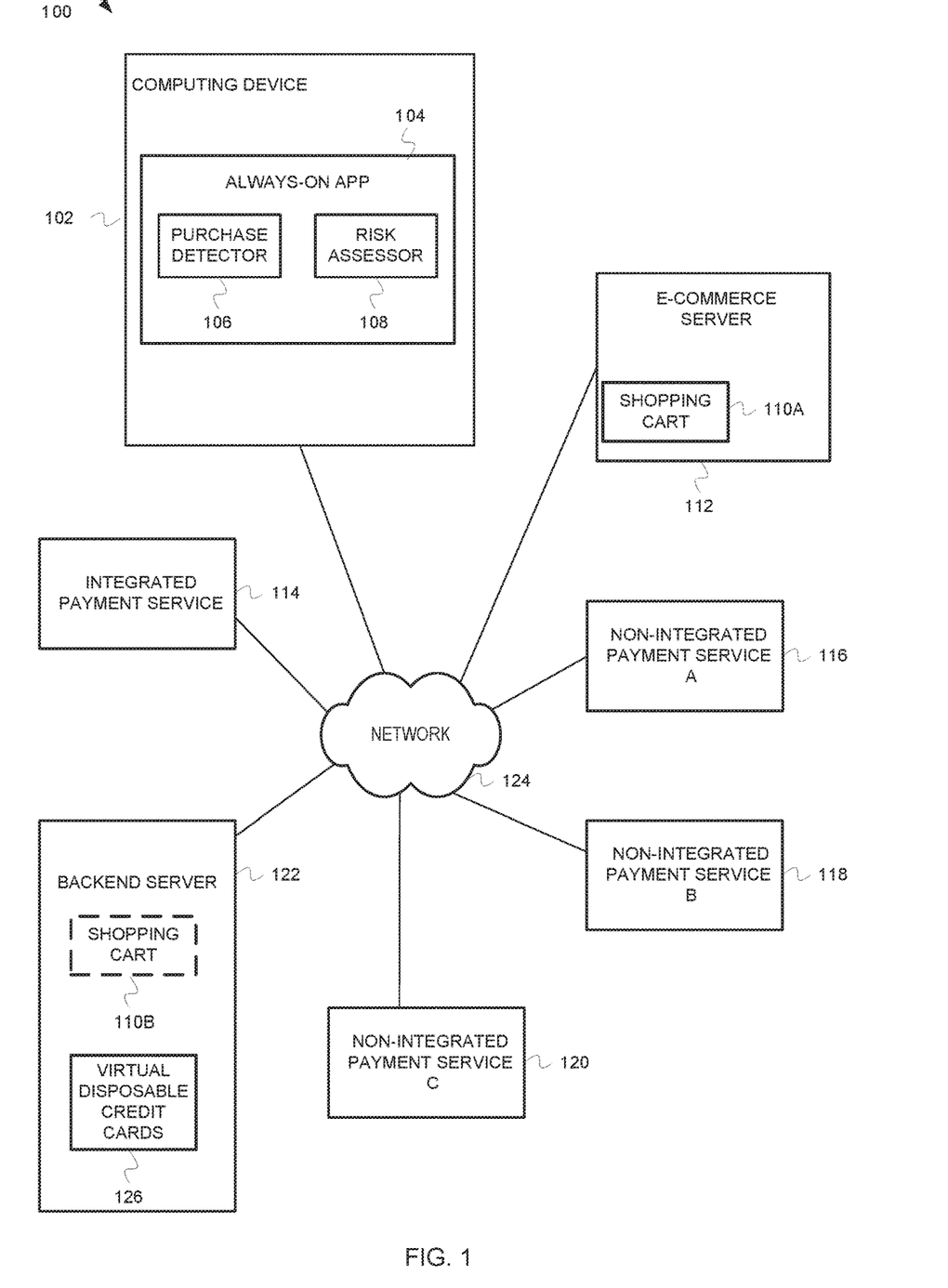
FIG. 1 is a block diagram illustrating a system for providing payment options according to one embodiment of the present invention.

FIG. 1 is a block diagram illustrating a system 100 for providing payment options according to one embodiment of the present invention. In one embodiment, system 100 includes a computing device 102 communicably coupled to a backend server 122 via a network 124. Also communicably coupled to network 124 can be an e-commerce server 112, an integrated payment service 114, and one or more non-integrated payment services (e.g., non-integrated payment service A 116, non-integrated payment service B 118, and non-integrated payment service C 120). Network 124 can be any type and combination of wired and wireless networks. In some aspects, network 124 can be the Internet.

Computing device 102 can be any type of device with one or more processors to execute software programs. Examples of such devices include a desktop computer, server computer, laptop computer, tablet computer, mainframe computer, smartphone, personal digital assistant, set top box, or any other computing device capable of executing the methods described herein. Computing device 102 can include an always-on application 104. Always-on application 104 can be an application that is started as part of the startup processing performed by computing device 102 after it is booted, and stays running thereafter. Alternatively, always-on application 104 can be started when a web browser or other application is started. As an example, always-on application 104 can be anti-malware software such as that available from AVAST Software s.r.o. of Prague, Czech Republic. Those of skill in the art having the benefit of the disclosure will appreciate that other always-on applications exist, and that the systems and methods of the disclosure can be implemented, at least in part, in such always-on applications.

Always-on application 104 can include a purchase detector 106 and optionally a risk assessor 108. Purchase detector 106 can be configured to recognize when a purchase from an online shop is being initiated by a user of computing device 102. Risk assessor 108 can be configured to determine one or more risk factors associated with the user.

As with computing device 102, e-commerce server 112 can also be any type of device with one or more processors, and can include desktop computers, server computers, mainframe computers, etc. that can provide an e-commerce site such as an online shop. An online shop typically comprises a website that provides a user a means for browsing for goods and services, and paying for selected goods and services online. Well known examples of such online shops include Amazon and eBay. Further, retailers such as Walmart and Target also provide online shops. The aforementioned examples are but several of a myriad of online shops, both large and small, that provide the capability for a user to order and pay for goods and services online. While embodiments of the present invention are described herein as being configured for making payments to online shops, it will be also appreciated that various aspects of the present invention may be adapted for allowing users to make payments at physical shops and vendors (i.e., so-called brick and mortar locations) using a non-integrated payment service, for example through various mobile payment systems or methods.

E-commerce server 112 can maintain a shopping cart 110A that is associated with a user of an online shop. Shopping cart 110A can include items that the user has selected for purchase, but have not been paid for.

Like e-commerce server 112, integrated payment service 114 and non-integrated payment services A 116, B 118 and C 120 can also be implemented on any type of device with one or more processors, such as desktop computers, server computers, mainframe computers, etc.

Integrated payment service 114 can be a service that provides payment services for an online shop on an e-commerce server 112. For example, integrated payment service 114 can provide for the transfer of a payment for goods and services that a user desires to purchase from the user to the operator of the online shop. For example, integrated payment service 114 can deduct funds for payment from a user's account (e.g., bank account, credit card account, loyalty points account, gift card account, etc.) and transfer the funds to an account held by the operator of the online shop. The term "integrated" in integrated payment service 114 is used to indicate that the payment service is integrated within the online shop such that the payment service can be selected on a user interface provided by the online shop. For example, a button, hyperlink, drop-down box or other user-interface element may be selected by a user in order to indicate how the user intends to provide payment via the integrated payment service for the goods and/or services purchased via the online shop. A well-known example of such an integrated payment service is the PayPal payment service. In order for a payment service to be integrated with an online shop, the payment service must typically enter into an agreement with the operator of the online shop. Further, the online shop must be programmed to provide the appropriate user interface elements and supporting code to interface with the integrated payment service 114.

Non-integrated payment services A 116, B 118 and C 120 can provide the same or similar functionality to integrated payment service 114. For example, non-integrated payment services A 116, B 118 and C 120 can deduct funds for payment from a user's account (e.g., bank account, credit card account, loyalty points account, gift card account, cryptocurrency account, etc.) and transfer the funds to an account held by the operator of the online shop. However, non-integrated payment services A 116, B 118 and C 120 are not integrated with an online shop on e-commerce server 112 in that the online shop may not have any agreements with the operator of the online shop, and there are no user-interface elements or other mechanisms that allow a purchaser of goods and/or services via the online shop to use the service provided by non-integrated payment services A 116, B 118 and C 120. Although the example system 100 illustrated in FIG. 1 shows three non-integrated payment services, those of skill in the art will appreciate that more or fewer non-integrated payment services may be present. Further, there may be more than one integrated payment service.

Backend server 122 can cooperate with purchase detector 106 and/or risk assessor 108 to provide alternative payment services to a purchaser at an online shop on e-commerce server 112. For example, backend server 122 can provide a user access to non-integrated payment services A 116, B 118 and/or C 120 in addition to, or instead of, integrated payment service 114. In some embodiments, backend server 122 can include a shopping cart 110B and virtual disposable credit cards 126 or the like. Shopping cart 110B can be a copy of shopping cart 110A. A virtual disposable credit card can be a credit card number that does not appear on a physical credit card, but can be used like a physical credit card to pay for goods and/or services. The virtual disposable credit card typically can be associated with a physical credit card account, bank account or other payment account (e.g., PayPal, loyalty points, gift card, etc.). Some or all of the functionality provided by backend server 122 could be distributed to other components. For example, some or all of the functionality of the backend server 122 could be provided by a backend component of always-on application 104.

Figure 2:
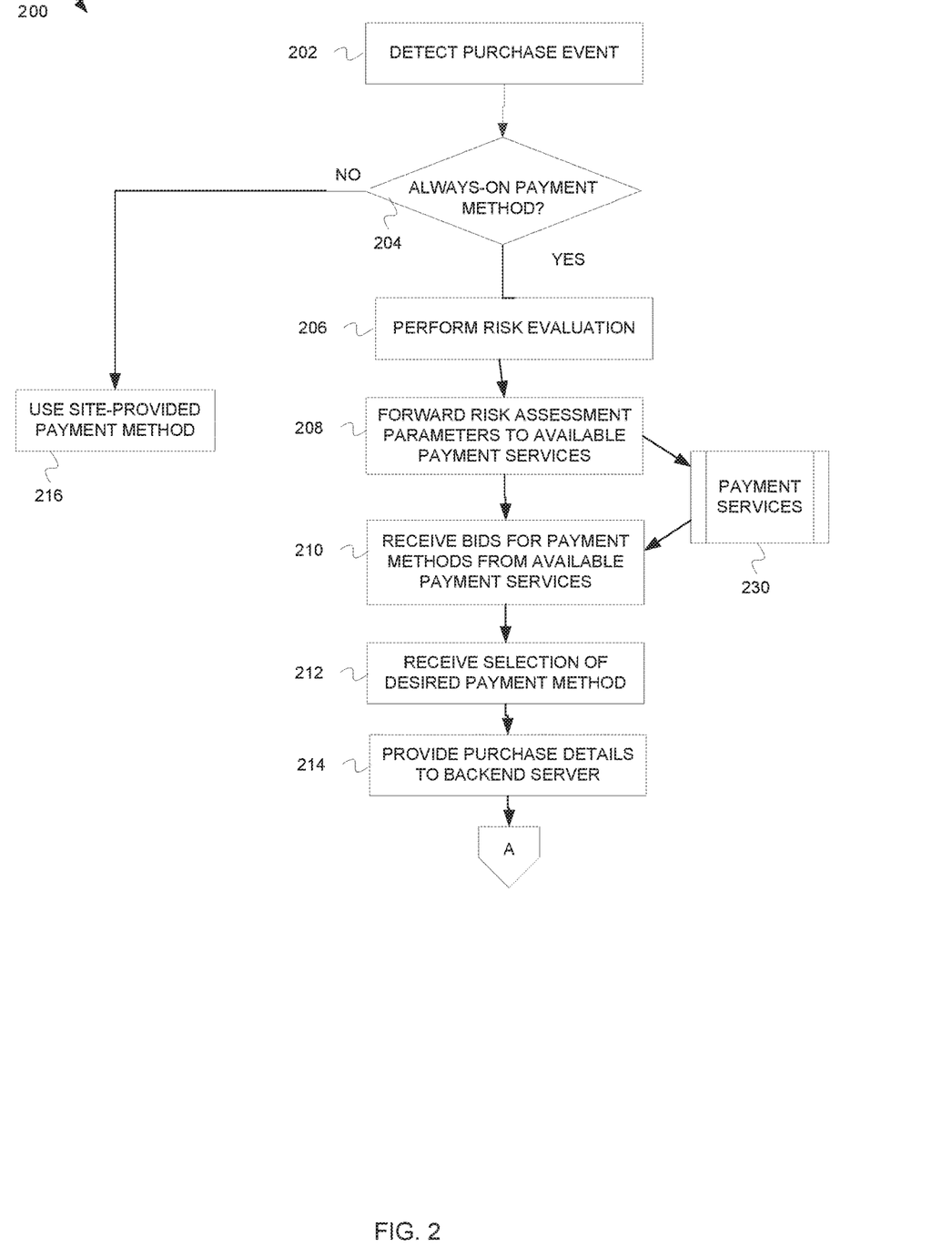
FIG. 2 is a flowchart illustrating operations of a method for providing payment options according to one embodiment of the present invention.
Figure 3:
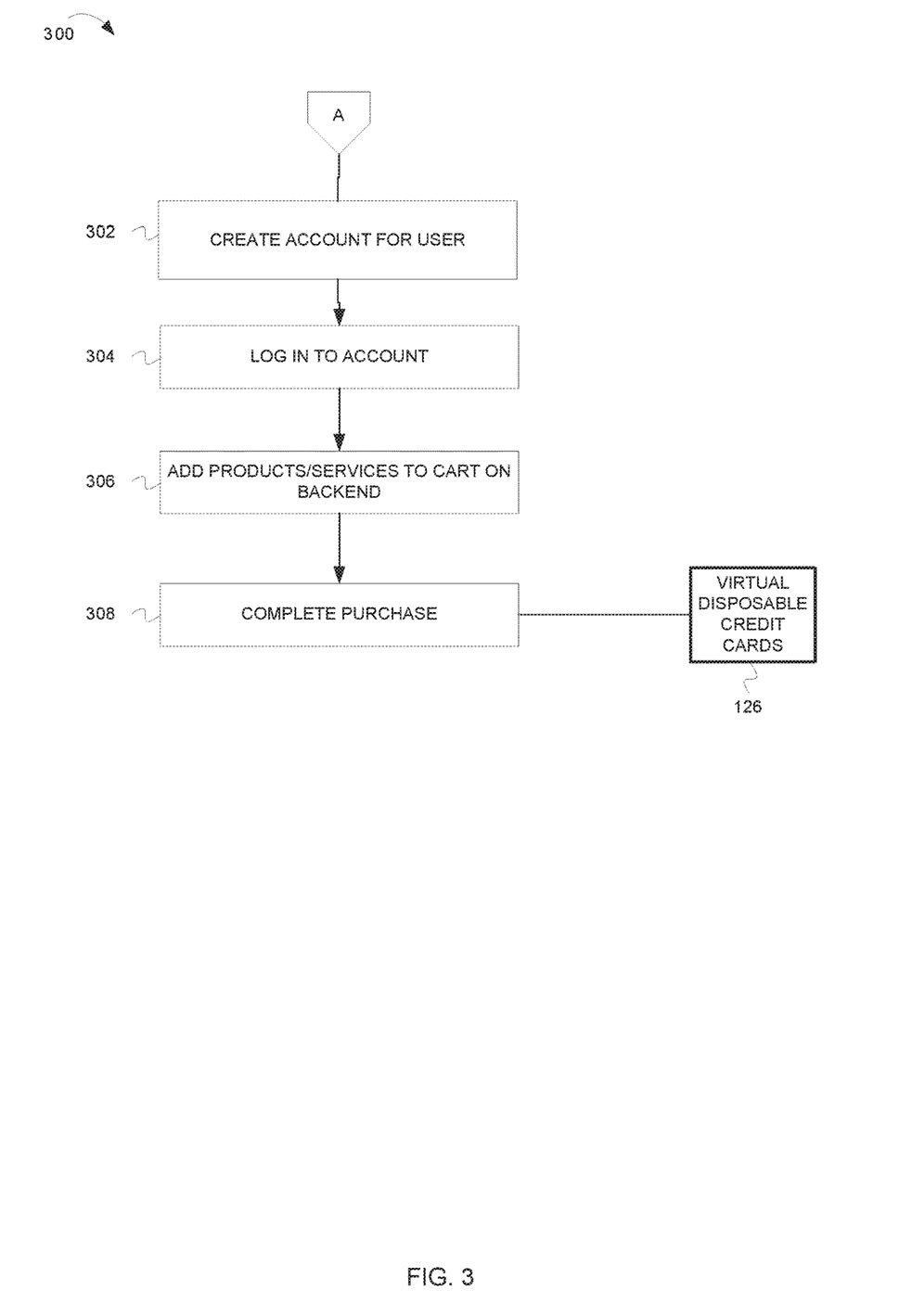
FIG. 3 is a flowchart illustrating operations of a method for completing payment via a user selected option according to one embodiment of the present invention.

Further details on the operation of system 100 will now be provided with reference to FIGS. 2 and 3.

FIG. 2 is a flowchart 200 illustrating operations of a method for providing payment options according to embodiments. At block 202, a system executing the method, such as purchase detector 106 of computing device 102, detects a purchase event. For example, a user may have selected a "checkout" or similarly labeled user interface element in order to initiate the purchase of items in a shopping cart 110A. In some embodiments, a purchase event can be detected by the uniform resource locator (URL) that the user visits. In alternative embodiments, a purchase event can be detected based, at least in part, on specific words in a web page of the URL. In further alternative embodiments, a purchase event can be detected based on forms in the web page. A combination of two or more of the above may also be used. In some embodiments, purchase events are detected on a supported online shop. A supported online shop is one in which the purchase detector 106 and/or backend server 122 have been configured with information enabling the purchase detector 106 and/or backend server 122 to handle the components of the online shop. For example, the purchase detector 106 and/or backend server 122 may be configured with information allowing the purchase detector 106 and/or backend server 122 to learn what products are in the shopping cart, where to fill in user details (name, address, etc.), payment details, etc.

At decision block 204, the purchase detector can determine if a non-integrated payment service option is to be provided. In some embodiments, a popup can be presented on a display of computing device 102 offering the user the option of paying for the items in the shopping cart 110A using a non-integrated payment service (e.g., non-integrated payment service A 116, B 118 and/or C 120). If the user elects not to use a non-integrated payment service, then the method proceeds to block 216, where the payment service integrated with the online shop can be used.

If the user elects to use a non-integrated payment service (e.g., non-integrated payment service A 116, B 118 and/or C 120), then optionally, at block 206, a risk assessor 108 can perform a risk evaluation of the user. Some embodiments can utilize data collected by the always-on application 104 to perform the risk evaluation. For example, the risk evaluation may be based, a least in part, on various combinations of one or more of data regarding the user's location, past browsing history, computer components, product purchase history, time of day, etc. In alternative embodiments, the risk evaluation may be performed by a third party and forwarded to the purchase detector.

The results of the risk evaluation can be forwarded to non-integrated payment services at block 208. The non-integrated payment services can utilize the risk evaluation results to decide if they want to provide payment services to the user, and if so, to tailor the payment terms to match the risk criteria specific to user and to the specific purchase. For example, the non-integrated payment service can utilize the risk evaluation results to help determine amount of credit, number of installments, delayed payments, etc.

At block 210, the purchase detector 106 can receive offers or bids of payment methods available from non-integrated payment services that choose to respond.

At block 212, in some embodiments, the purchase detector 106 can select one of the offers. Various criteria can be used to make the selection. As examples, the criteria to select which payment method is offered to the user can include better financial terms, commission or fees to the provider of the always-on application, etc. In alternative embodiments, a user can make a selection from among the offered non-integrated payment services.

At block 214, purchase details are provided to the backend server 122. At this point (block A), the system executing the method can wait while the backend server performs purchase completion operations, as illustrated in FIG. 3. The user may be shown a popup or other user interface element asking the user to wait while the purchase is completed.

FIG. 3 is a flowchart illustrating operations of a method for completing payment via a user selected option according to various embodiments of the present invention. The operations illustrated in FIG. 3 may take place in response to receiving purchase details from a computing device 102.

At block 302, the backend server 122 can create an account for the user on the online shop. The account may be created in a manner that is transparent to the user. That is, the user does not necessarily see or know the account has been created. If the user has previously selected the same payment service for a purchase from same online shop, then a previously created account may be determined and used.

At block 304, the user is logged in using the account created or determined at block 302.

At block 306, the products from shopping cart 110A selected by the user are copied (i.e., added again) to shopping cart 110B for the account created at block 302. The backend server 122 can detect which products are in the cart on the user's computing device 102, and add these to shopping cart 110B. In some embodiments, the items in the shopping cart 110A can be detected by going to every product page for products in the shopping cart 110A, and autonomously clicking add to have the item added to shopping cart 110B. In alternative embodiments, a shortcut, if present, may be used. For example, the shopping cart 110A may already have a URL can be accessed and copied to shopping cart 110B. In further alternative embodiments, a website cookie may be copied.

At block 308, the products in the shopping cart 110B for the account created at block 302 are purchased. In some embodiments, a virtual disposable credit card 126 supplied by the selected non-integrated payment service can be provided as payment for the items in shopping cart 110B. In some embodiments, the virtual disposable credit card 126 can be filled to the exact amount of the purchase. The virtual disposable credit card can be entered via the integrated payment service 114 for the online shop.

After completion of block 308, the always-on application 104 can confirm to the user that the purchase was completed successfully.

After execution of the methods illustrated in FIGS. 2 and 3, the online store is paid and can proceed to ship the purchased goods or provide the purchased services. The non-integrated payment service can collect the payment from the user under the terms of the agreement between the user and the non-integrated payment service.

Figure 4:
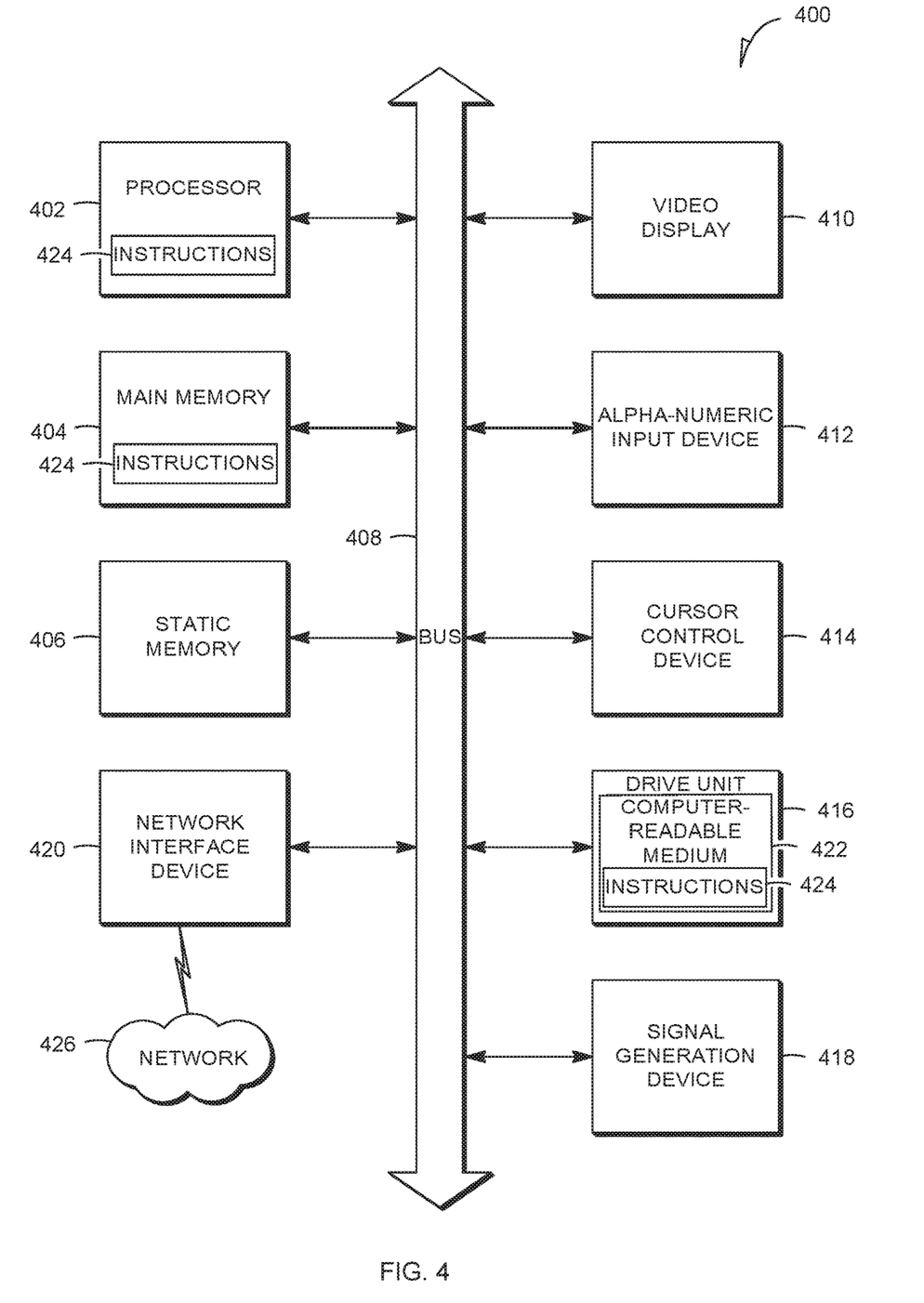
FIG. 4 is a block diagram of an example embodiment of a computer system upon which embodiments of the inventive subject matter can execute.

FIG. 4 is a block diagram of an example embodiment of a computer system 400 upon which embodiments of the inventive subject matter can execute. The description of FIG. 4 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

Moreover, those skilled in the art will appreciate that the aspects of the disclosure may be practiced with other computer system configurations, including hand-held devices, multiprocessor systems, microprocessor-based or programmable consumer electronics, smartphones, network PCs, minicomputers, mainframe computers, and the like. Aspects of the disclosure may also be practiced in distributed computer environments where tasks are performed by I/O remote processing devices that are linked through a communications network. In a distributed computing environment, program modules may be located in both local and remote memory storage devices.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). In example embodiments, the computer system 400 also includes one or more of an alpha-numeric input device 412 (e.g., a keyboard), a user interface (UI) navigation device or cursor control device 414 (e.g., a mouse), a disk drive unit 416, a signal generation device 418 (e.g., a speaker), and a network interface device 420.

The disk drive unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

In the claims below, certain elements may be labeled with a lower letter. Such labeling is merely for convenience in referring to the elements in dependent claims. No ordering of elements is intended or required by such labeling.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for providing a non-integrated payment service for an online shop, the method comprising:
   detecting, by one or more processors, that a purchase has been initiated at the online shop;
   selecting, by the one or more processors, transparently to a user and without knowledge of the user, a non-integrated payment service from a plurality of non-integrated payment services;
   creating, by the one or more processors, transparently to the user and without knowledge of the user, a user account on behalf of the user;
   adding, by the one or more processors, items from a first shopping cart to a second shopping cart associated with the user account, wherein the second shopping cart is associated with a backend server; and
   paying, by the one or more processors, for the items in the second shopping cart utilizing a virtual payment device associated with the selected non-integrated payment service.

2. The method of claim 1 further comprising:
   performing a risk evaluation of the user; and
   forwarding results of the risk evaluation to the plurality of non-integrated payment services, wherein at least one of the plurality of non-integrated payment services is configured to determine terms of an offer based, at least in part, on the results of the risk evaluation;
   wherein selecting the non-integrated payment service is based, at least in part, on the terms of the offer.

3. The method of claim 1 further comprising receiving offers of payment methods from the plurality of non-integrated payment services.

4. The method of claim 1, wherein the virtual payment device comprises a virtual credit card.

5. The method of claim 1, wherein the virtual payment device is supplied by the selected non-integrated payment service.

6. The method of claim 1, wherein the selected non-integrated payment service is selected by the user.

7. The method of claim 1 further comprising detecting items in the first shopping cart.

8. The method of claim 1, wherein the adding of items from the first shopping cart to the second shopping cart is undertaken by at least one of:
   copying the items from the first shopping cart into the second shopping cart using a computing device of the user;
   accessing a web page for each of the items in the first shopping cart and autonomously clicking to have the respective items added to the second shopping cart; and
   accessing a uniform resource locator (URL) associated with the first shopping cart and copying the URL into the second shopping cart.

9. A non-transitory machine-readable medium having instructions stored thereon, the instructions comprising computer executable instructions that when executed, cause one or more processors to:
   detect that a purchase has been initiated at an online shop;
   select, transparently to a user and without knowledge of the user, a non-integrated payment service from a plurality of non-integrated payment services;
   create a user account on behalf of the user and transparently to the user and without knowledge of the user;
   add items from a first shopping cart to a second shopping cart associated with the user account, wherein the second shopping cart is associated with a backend server; and
   pay for the items in the second shopping cart utilizing a virtual payment device associated with the selected non-integrated payment service.

10. The non-transitory machine-readable medium of claim 9, wherein the computer executable instructions further comprise computer executable instructions to:
    perform a risk evaluation of the user; and
    forward results of the risk evaluation to the plurality of non-integrated payment services, wherein at least one of the plurality of non-integrated payment services is configured to determine terms of an offer based, at least in part, on the results of the risk evaluation;
    wherein the selection of the non-integrated payment service is based, at least in part, on the terms of the offer.

11. The non-transitory machine-readable medium of claim 10, wherein the computer executable instructions further comprise computer executable instructions to receive offers of payment methods from the plurality of non-integrated payment services.

12. The non-transitory machine-readable medium of claim 9, wherein the virtual payment device comprises a virtual credit card.

13. The non-transitory machine-readable medium of claim 9, wherein the virtual payment device is supplied by the selected non-integrated payment service.

14. The non-transitory machine-readable medium of claim 9, wherein the computer executable instructions further comprise computer executable instructions to detect items in the first shopping cart.

15. The non-transitory machine-readable medium of claim 9, wherein the adding of items from the first shopping cart to the second shopping cart is undertaken by at least one of:
- copying the items from the first shopping cart into the second shopping cart using a computing device of the user;
- accessing a web page for each of the items in the first shopping cart and autonomously clicking to have the respective items added to the second shopping cart; and
- accessing a uniform resource locator (URL) associated with the first shopping cart and copying the URL into the second shopping cart.

16. A system for providing a non-integrated payment service for an online shop, the system comprising:
- a backend server;
- one or more processors; and
- a non-transitory machine-readable medium having computer executable instructions stored thereon, that when executed, cause the one or more processors to:
  - detect that a purchase has been initiated at the online shop;
  - select, transparently to a user and without knowledge of the user, a non-integrated payment service from a plurality of non-integrated payment services;
  - create a user account on behalf of the user, transparently to the user and without knowledge of the user;
  - add items from a first shopping cart to a second shopping cart associated with the user account, wherein the second shopping cart is associated with the backend server; and
  - pay for the items in the second shopping cart utilizing a virtual payment device associated with the selected non-integrated payment service.

17. The system of claim 16, wherein the computer executable instructions further comprise computer executable instructions to:
- perform a risk evaluation of the user; and
- forward results of the risk evaluation to the plurality of non-integrated payment services, wherein at least one of the plurality of non-integrated payment services is configured to determine terms of an offer based, at least in part, on the results of the risk evaluation;
- wherein the selection of the non-integrated payment service is based, at least in part, on the terms of the offer.

18. The system of claim 17, wherein the computer executable instructions further comprise computer executable instructions to receive offers of payment methods from the plurality of non-integrated payment services.

19. The system of claim 16, wherein the virtual payment device comprises a virtual credit card.

20. The system of claim 16, wherein the virtual payment device is supplied by the selected non-integrated payment service.

21. The system of claim 16, wherein the computer executable instructions further comprise computer executable instructions to detect items in the first shopping cart.

22. The system of claim 16, wherein the adding of items from the first shopping cart to the second shopping cart is undertaken by at least one of:
- copying the items from the first shopping cart into the second shopping cart using a computing device of the user;
- accessing a web page for each of the items in the first shopping cart and autonomously clicking to have the respective items added to the second shopping cart; and
- accessing a uniform resource locator (URL) associated with the first shopping cart and copying the URL into the second shopping cart.

* * * * *